United States Patent
Kwak et al.

(10) Patent No.: US 11,552,760 B2
(45) Date of Patent: Jan. 10, 2023

(54) WIRELESS COMMUNICATION METHOD AND WIRELESS COMMUNICATION TERMINAL USING SAME

(71) Applicants: WILUS INSTITUTE OF STANDARDS AND TECHNOLOGY INC., Gyeonggi-do (KR); SK TELECOM CO., LTD., Seoul (KR)

(72) Inventors: Jinsam Kwak, Gyeonggi-do (KR); Juhyung Son, Gyeonggi-do (KR); Geonjung Ko, Gyeonggi-do (KR)

(73) Assignees: WILUS INSTITUTE OF STANDARDS AND TECHNOLOGY INC., Gyeonggi-Do (KR); SK TELECOM CO, LTD., Seoul (KR)

( * ) Notice: Subject to any disclaimer, the term of this patent is extended or adjusted under 35 U.S.C. 154(b) by 0 days.

(21) Appl. No.: 17/155,086

(22) Filed: Jan. 22, 2021

(65) Prior Publication Data

US 2021/0143958 A1 May 13, 2021

Related U.S. Application Data

(63) Continuation of application No. 16/240,745, filed on Jan. 5, 2019, now Pat. No. 10,911,196, which is a
(Continued)

(30) Foreign Application Priority Data

Aug. 25, 2014 (KR) .......... 10-2014-0111018
Nov. 25, 2014 (KR) .......... 10-2014-0165686

(51) Int. Cl.
*H04L 5/00* (2006.01)
*H04L 27/26* (2006.01)
*H04L 27/18* (2006.01)

(52) U.S. Cl.
CPC .......... *H04L 5/0048* (2013.01); *H04L 5/0044* (2013.01); *H04L 27/18* (2013.01);
(Continued)

(58) Field of Classification Search
None
See application file for complete search history.

(56) References Cited

U.S. PATENT DOCUMENTS

2002/0126631 A1  9/2002 Lee
2007/0047666 A1  3/2007 Trachewsky
(Continued)

FOREIGN PATENT DOCUMENTS

CN  101322333  12/2008
CN  101286753  11/2012
(Continued)

OTHER PUBLICATIONS

Notice of Allowance dated Aug. 26, 2021 for Korean Patent Application No. 10-2020-7019254 and its English translation provided by the Applicant's foreign counsel.
(Continued)

*Primary Examiner* — Anez C Ebrahim
(74) *Attorney, Agent, or Firm* — Ladas & Parry, LLP

(57) ABSTRACT

The present invention relates to a wireless communication method for suggesting a packet preamble structure for efficient communication in a wireless communication environment in which a legacy terminal and a non-legacy terminal are mixed, and a wireless communication terminal using the same.

For this, the present invention provides a wireless communication method including: generating a packet including a first preamble and a second preamble, wherein a first symbol and a second symbol of the second preamble are modulated
(Continued)

using binary phase shift keying (BPSK); and transmitting the generated packet and a wireless communication terminal using the same.

14 Claims, 18 Drawing Sheets

Related U.S. Application Data continuation of application No. 15/721,725, filed on Sep. 29, 2017, now Pat. No. 10,256,958, which is a continuation of application No. 15/438,720, filed on Feb. 21, 2017, now Pat. No. 9,813,210, which is a continuation of application No. PCT/KR2015/008892, filed on Aug. 25, 2015.

(52) U.S. Cl.
CPC ...... *H04L 27/2602* (2013.01); *H04L 27/2603* (2021.01); *H04L 27/2613* (2013.01); *H04L 5/0007* (2013.01); *H04L 27/26136* (2021.01)

(56) References Cited

U.S. PATENT DOCUMENTS

| | | | |
|---|---|---|---|
| 2011/0096685 A1 | 4/2011 | Lee et al. | |
| 2011/0194475 A1 | 8/2011 | Kim et al. | |
| 2012/0327871 A1 | 12/2012 | Ghosh et al. | |
| 2014/0211775 A1* | 7/2014 | Sampath | H04L 27/2666 370/338 |
| 2014/0307650 A1* | 10/2014 | Vermani | H04L 27/2603 370/329 |
| 2015/0023335 A1* | 1/2015 | Vermani | H04L 27/2613 370/338 |
| 2016/0080056 A1 | 3/2016 | Porat et al. | |
| 2019/0140800 A1 | 5/2019 | Kwak et al. | |

FOREIGN PATENT DOCUMENTS

| | | |
|---|---|---|
| CN | 103534966 | 1/2014 |
| CN | 103621033 | 3/2014 |
| CN | 103825692 | 5/2014 |
| CN | 103891342 | 6/2014 |
| CN | 103947143 | 7/2014 |
| CN | 103947171 | 7/2014 |
| CN | 103959670 | 7/2014 |
| CN | 102550096 | 7/2015 |
| EP | 2 712 138 | 3/2014 |
| KR | 10-2007-0084289 | 8/2007 |
| KR | 10-2009-0084991 | 8/2009 |
| KR | 10-2012-0064088 | 6/2012 |
| KR | 10-2012-0081040 | 7/2012 |
| KR | 10-2013-0040145 | 4/2013 |
| KR | 10-2014-0020176 | 2/2014 |
| KR | 10-2014-0034829 | 3/2014 |
| KR | 10-2014-0053128 | 5/2014 |
| KR | 10-2014-0098068 | 8/2014 |
| TW | 201308960 | 2/2013 |
| WO | 2015/003119 | 1/2015 |
| WO | 2016/032216 | 3/2016 |

OTHER PUBLICATIONS

Office Action dated Jan. 22, 2022 for Korean Patent Application No. 10-2021-7038616 and its English translation provided by the Applicant's foreign counsel.
International Search Report for PCT/KR2015/008892 dated Jan. 4, 2016 and its English translation from WIPO (published as WO 2016/032216).
Written Opinion of the International Searching Authority for PCT/KR2015/008892 dated Jan. 4, 2016 and its English machine translation from WIPO (published as WO 2016/032216).
Office Action dated Feb. 25, 2016 for Korean Patent Application No. 10-2015-7036318 and its English translation provided by Applicant's foreign counsel.
International Preliminary Report on Patentability (Chapter I) for PCT/KR2015/008892 dated Feb. 28, 2017 and its English machine translation from WIPO (published as WO 2016/032216).
Notice of Allowance dated Oct. 5, 2018 for U.S. Appl. No. 15/721,725.
Office Action dated Mar. 13, 2018 for U.S. Appl. No. 15/721,725.
Notice of Allowance dated Jun. 2, 2016 for Korean Patent Application No. 10-2015-7036318 and its English translation provided by Applicant's foreign counsel.
Office Action dated Sep. 20, 2019 for Korean Patent Application No. 10-2016-7016159 and its English translation provided by Applicant's foreign counsel.
Notice of Allowance dated Jul. 13, 2017 for U.S. Appl. No. 15/438,720.
Office Action dated Aug. 20, 2019 for Chinese Patent Application No. 201580045652.X and its English translation provided by Applicant's foreign counsel.
Notice of Allowance dated Sep. 24, 2020 for U.S. Appl. No. 16/240,745 (now published as US 2019/0140800).
Office Action dated May 6, 2020 for U.S. Appl. No. 16/240,745 (now published as US 2019/0140800).
Notice of Allowance dated Mar. 10, 2020 for Chinese Patent Application No. 201580045652.X and its English translation provided by Applicant's foreign counsel.
Office Action dated Feb. 8, 2021 for Korean Patent Application No. 10-2020-7019254 and its English translation provided by Applicant's foreign counsel.
Office Action dated Sep. 19, 2022 for Chinese Patent Application No. 202010447512.8 and its English translation provided by the Applicant's foreign counsel.
Office Action dated Sep. 26, 2022 for Chinese Patent Application No. 202010447517.0 and its English translation provided by the Applicant's foreign counsel.

* cited by examiner

WIRELESS COMMUNICATION METHOD AND WIRELESS COMMUNICATION TERMINAL USING SAME

CROSS-REFERENCE TO RELATED APPLICATIONS

This application is a continuation of U.S. patent application Ser. No. 16/240,745 filed on Jan. 5, 2019, which is a continuation of U.S. patent application Ser. No. 15/721,725 filed on Sep. 29, 2017, issued as U.S. Pat. No. 10,256,958 on Apr. 9, 2019, which is a continuation of U.S. patent application Ser. No. 15/438,720 filed on Feb. 21, 2017, issued as U.S. Pat. No. 9,813,210 on Nov. 7, 2017, which is a continuation of International Patent Application No. PCT/KR2015/008892 filed on Aug. 25, 2015, which claims the priority to Korean Patent Application No. 10-2014-0111018 filed in the Korean Intellectual Property Office on Aug. 25, 2014, and Korean Patent Application No. 10-2014-0165686 filed in the Korean Intellectual Property Office on Nov. 25, 2014, the entire contents of which are incorporated herein by reference.

TECHNICAL FIELD

The present invention relates to a wireless communication method for suggesting a packet preamble structure for efficient communication in a wireless communication environment in which a legacy terminal and a non-legacy terminal are mixed, and a wireless communication terminal using the same.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a radio interface accepted by 802.11n, such as a wider radio frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

As described above, an object of the present invention is to provide high-efficiency/high-performance wireless LAN communication in a high-density environment.

Another object of the present invention is to automatically detect a format of a corresponding packet through information included in a preamble of a wireless LAN packet and distinguish legacy/non-legacy packets.

Another object of the present invention is to provide an efficient signal processing method in a communication situation between terminals supporting a plurality of communication methods.

Technical Solution

In order to achieve the objects, the present invention provides a wireless communication method and a wireless communication terminal as below.

First, an embodiment of the present invention provides a wireless communication terminal including: a transceiver configured to transmit and receive a wireless signal; and a processor configured to control an operation of the wireless communication terminal, wherein the processor generates a packet including a first preamble and a second preamble, wherein a first orthogonal frequency division multiplexing (OFDM) symbol and a second OFDM symbol of the second preamble are modulated using binary phase shift keying (BPSK), and transmits the generated packet.

In an embodiment, the first preamble may be a legacy preamble and may include a legacy short training field (L-STF), a legacy long training field (L-LTF), and a legacy signal field (L-SIG).

In an embodiment, the second preamble may be a non-legacy preamble and may include a non-legacy signal field (SIG) composed of a plurality of SIGs.

In an embodiment, the non-legacy SIG may include a first SIG composed of the first OFDM symbol of the second preamble and a second SIG composed of the second OFDM symbol and a third OFDM symbol of the second preamble.

In an embodiment, the first SIG may be a repeated L-SIG having at least a part of information identical to that of an L-SIG of the first preamble.

In an embodiment, the second SIG may be a high efficiency signal field A (HE-SIG-A).

In an embodiment, the non-legacy SIG may further include a repeated HE-SIG-A having at least a part of information identical to that of the HE-SIG-A.

In an embodiment, whether the non-legacy SIG includes the repeated HE-SIG-A may be indicated based on a modulation scheme used for a specific OFDM symbol of the second preamble.

In an embodiment, the specific OFDM symbol may include the third OFDM symbol of the second preamble.

In an embodiment, the non-legacy SIG may further include an HE-SIG-B after the second SIG.

In an embodiment, whether the non-legacy SIG further includes the HE-SIG-B may be indicated based on a modulation scheme used for a specific OFDM symbol of the second preamble.

In an embodiment, the specific OFDM symbol may include the third OFDM symbol of the second preamble.

In an embodiment, a modulation scheme used for the third OFDM symbol of the second preamble may indicate at least one of a configuration and a sequence of the second preamble.

In an embodiment, the third OFDM symbol may be modulated using any one of BPSK, quadrature binary phase shift keying (QBPSK), and quadrature phase shift keying (QPSK).

In an embodiment, the first preamble may further include non-legacy additional information for a non-legacy terminal.

In an embodiment, the non-legacy additional information may represent a wireless LAN communication standard mode used for the packet.

In an embodiment, the non-legacy additional information may indicate at least one of a configuration and a sequence of the second preamble.

In an embodiment, the non-legacy additional information may represent symbol structure information of a non-legacy OFDM symbol used in a specific region after a legacy preamble of the packet.

In an embodiment, the OFDM symbol structure information may represent cyclic prefix (CP) length information of an OFDM symbol used in the non-legacy region.

In an embodiment, the non-legacy additional information may be represented by a predetermined bit field of the first preamble.

In an embodiment, the first preamble may include a first subcarrier set for a legacy terminal and a second subcarrier set for a non-legacy terminal and the non-legacy additional information may be represented by the second subcarrier set of the first preamble.

In an embodiment, modulation schemes used for the first OFDM symbol to a third OFDM symbol of the second preamble may represent a wireless LAN communication standard mode used for the packet.

In an embodiment, when the first OFDM symbol, the second OFDM symbol, and the third OFDM symbol are modulated using BPSK, BPSK, and quadrature binary phase shift keying (QBPSK) respectively, the packet may be a non-legacy packet.

According to another embodiment of the present invention, there is provided a wireless communication terminal including: a transceiver configured to transmit and receive a wireless signal; and a processor configured to control an operation of the wireless communication terminal, wherein the wireless communication terminal receives a packet through the transceiver; and the processor determines whether the packet is a non-legacy packet based on orthogonal frequency division multiplexing (OFDM) symbol information after a legacy signal field (L-SIG) of a legacy preamble of the received packet.

In an embodiment, when a first OFDM symbol after the L-SIG of the packet is a repeated L-SIG having at least a part of information identical to that of the L-SIG of the packet, the packet may be determined as a non-legacy packet.

In an embodiment, when a first OFDM symbol, a second OFDM symbol, and a third OFDM symbol after the L-SIG of the packet are modulated using binary phase shift keying (BPSK), BPSK, and quadrature binary phase shift keying (QBPSK) respectively, the packet is determined as a non-legacy packet.

In addition, according to an embodiment of the present invention, there is provided a wireless communication method including: generating a packet including a first preamble and a second preamble, wherein a first symbol and a second symbol of the second preamble are modulated using binary phase shift keying (BPSK); and transmitting the generated packet.

In addition, according to another embodiment of the present invention, there is provided a wireless communication method including: receiving a wireless packet; and determining whether the received wireless packet is a non-legacy packet based on orthogonal frequency division multiplexing (OFDM) symbol information after a legacy signal field (L-SIG) of a legacy preamble of the received wireless packet.

Advantageous Effects

According to an embodiment of the present invention, it is possible to quickly and accurately detect a specific wireless LAN communication mode based on a reception signal in a communication situation between terminals supporting a plurality of communication methods during wireless communication.

In addition, according to an embodiment of the present invention, under a communication situation between terminals supporting a plurality of communication methods during wireless communication, an influence on a legacy terminal is minimized by transmitting and receiving additional information for a non-legacy mode, and it is possible to provide an improved performance to a non-legacy terminal in preparation for the legacy terminal.

In addition, according to an embodiment of the present invention, unnecessary power waste and data transmission/reception delay may be reduced by performing a quick distinction between legacy packets and non-legacy packets.

BEST MODE

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2014-0111018 and 10-2014-0165686 filed in the Korean Intellectual Property Office and the embodiments and mentioned items described in the respective applications, which form the basis of the priority, shall be included in the Detailed Description of the present application.

Figure 1:
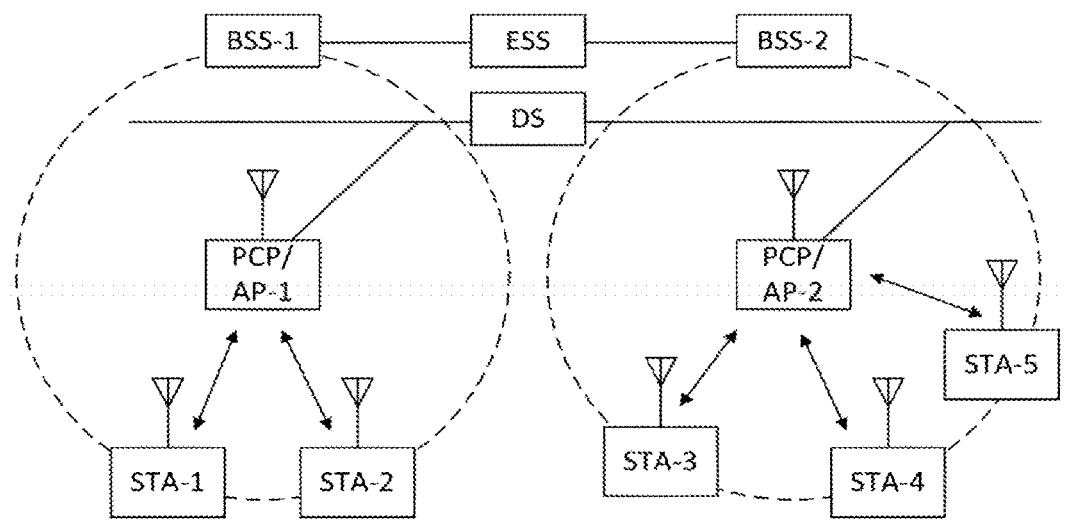
FIG. 1 is a diagram illustrating a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a radio medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
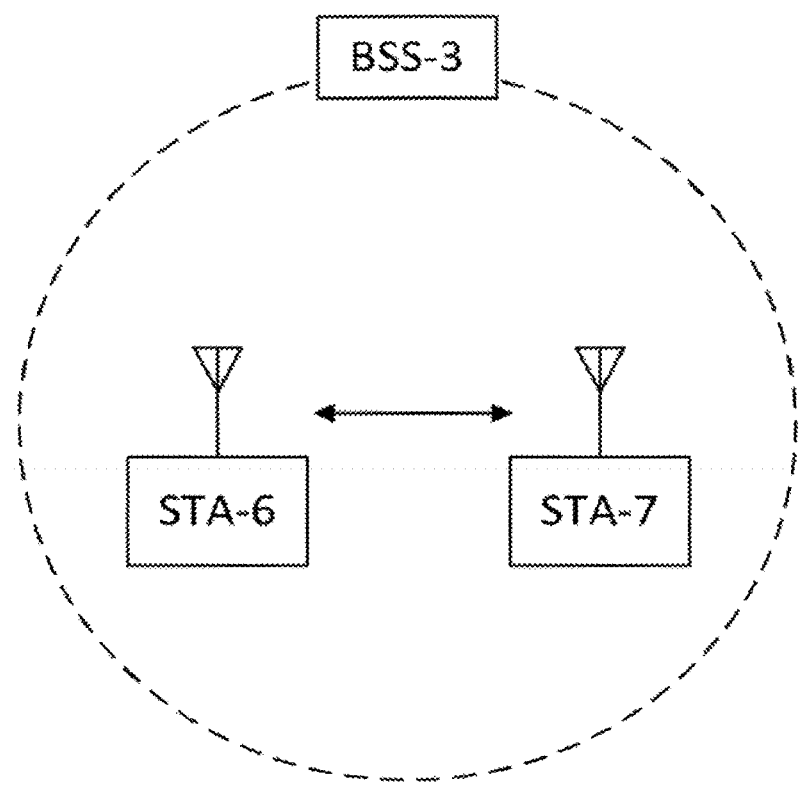
FIG. 2 is a diagram illustrating a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
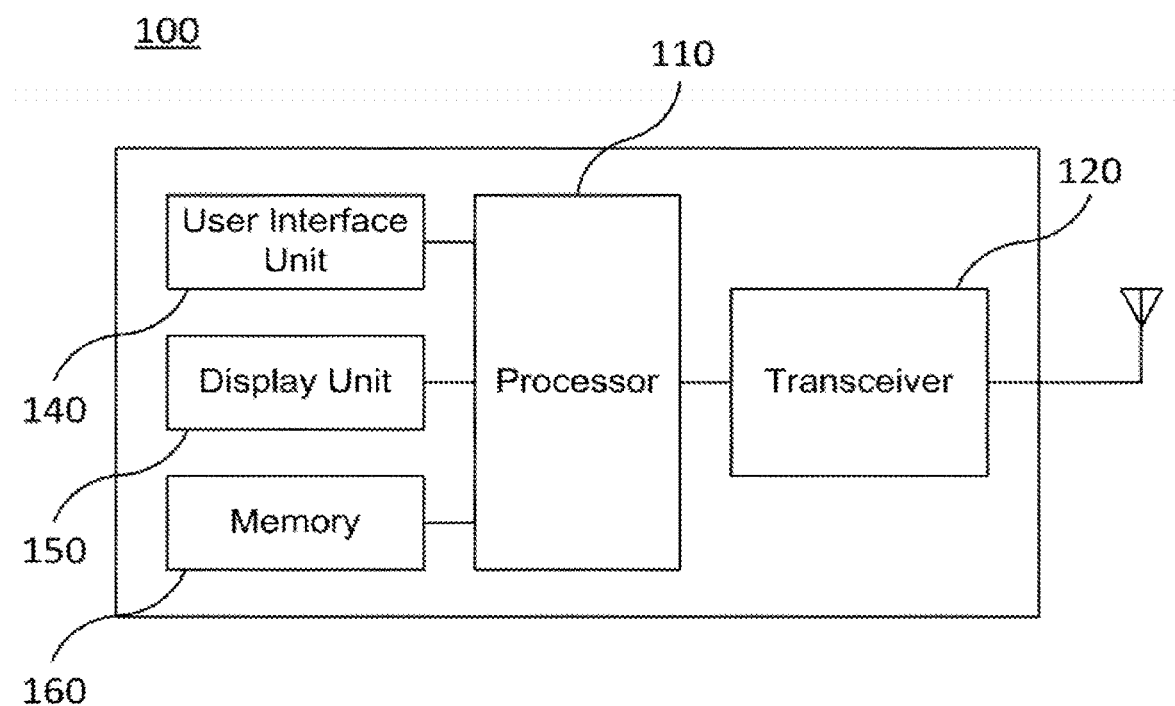
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
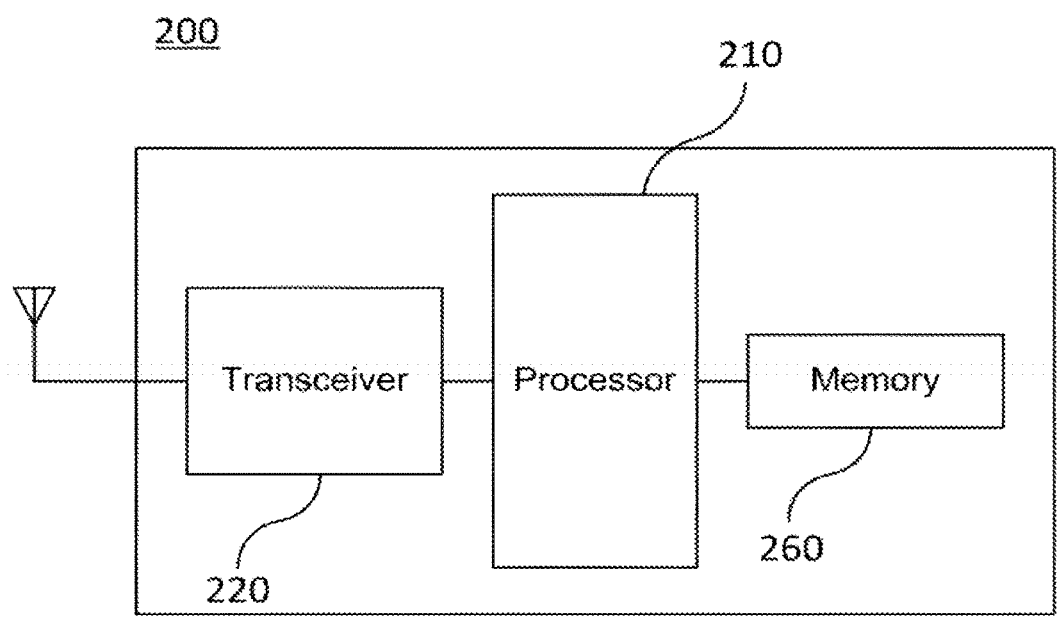
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as wireless signal transmission/reception of the AP 200 according to the embodiment of the present invention. A detailed embodiment thereof will be described below.

Figure 5:
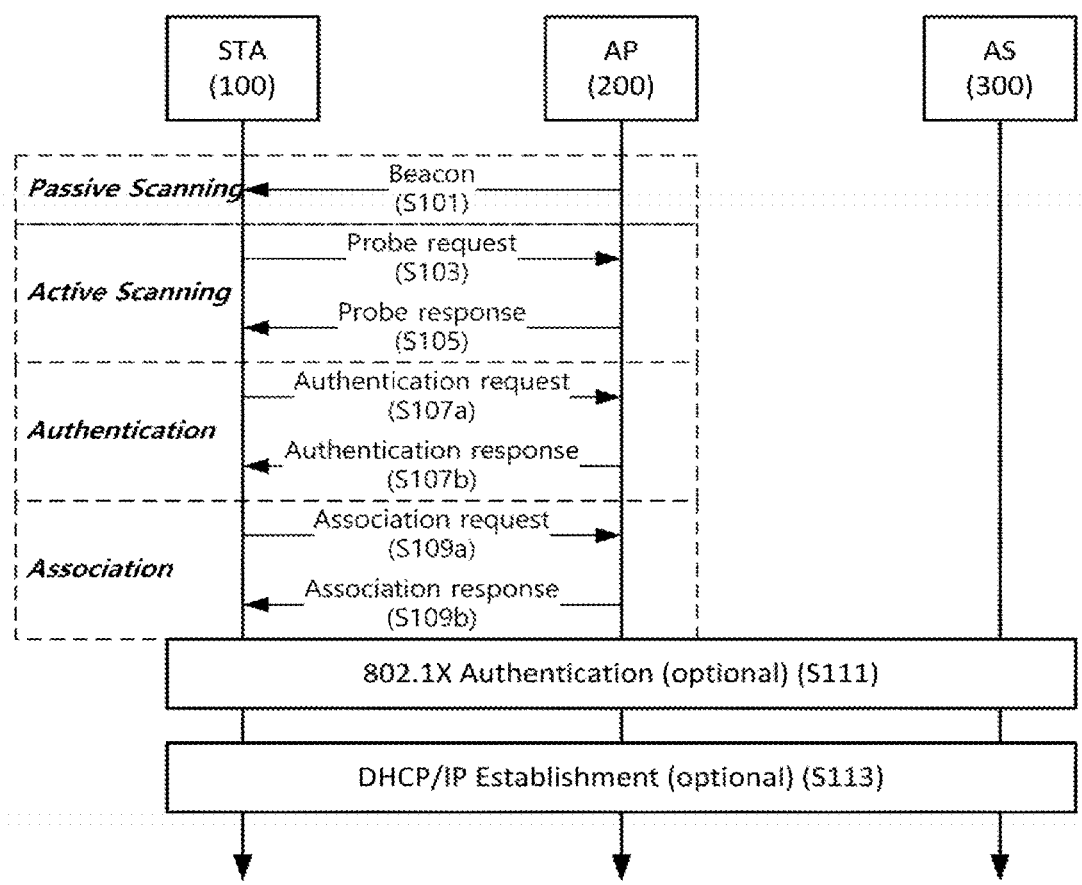
FIG. 5 schematically illustrates a process in which a STA establishes a link with an AP.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
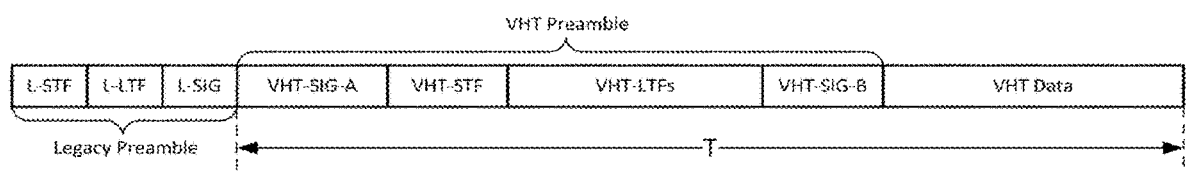
FIG. 6 is a diagram illustrating a structure of an IEEE 802.11ac packet supporting a legacy wireless LAN mode.

FIG. 6 illustrates a structure of an IEEE 802.11ac (hereinafter, referred to as 11ac) packet supporting a legacy wireless LAN mode. As shown in the drawing, the 11ac packet includes a legacy preamble, a very high throughput (VHT) preamble, and VHT data. The legacy preamble may be decoded by a conventional wireless LAN terminal such as an IEEE 802.11a (hereinafter, referred to as 11a) terminal, and the 11a terminal protects the 11ac packet based on the information extracted from the legacy preamble. On the other hand, the 11ac terminal obtains length (T) information of the corresponding packet from the legacy preamble of the 11ac packet, and therefore, the VHT preamble of the 11ac packet (for example, VHT-SIG) may not include additional information on the length of the corresponding packet.

Figure 7:
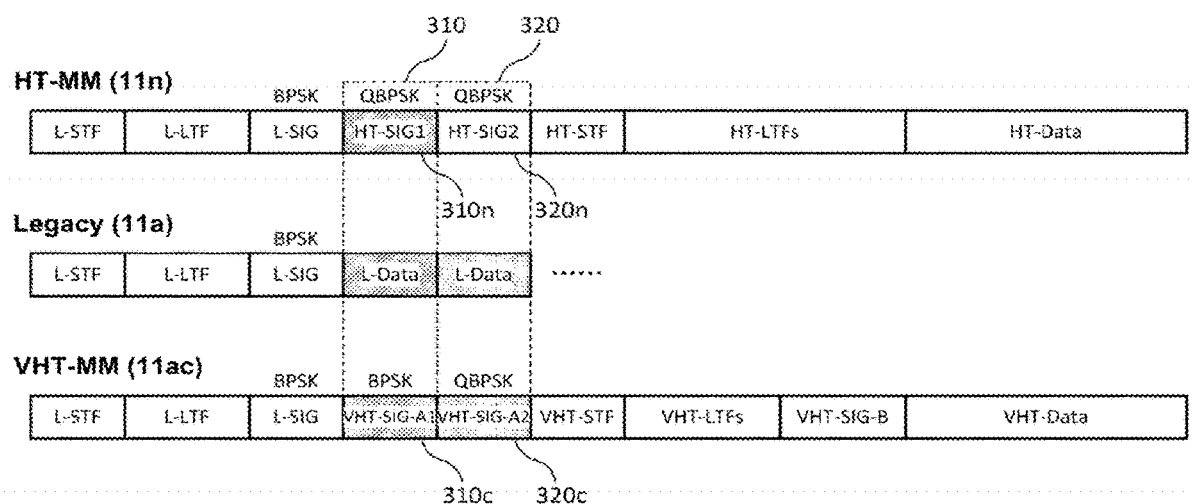
FIG. 7 is a diagram illustrating a comparison of the preamble structures of IEEE 802.11n, 11a, and 11ac packets.

FIG. 7 illustrates a comparison of the preamble structures of IEEE 802.11n (hereinafter, referred to as 11n), 11a and 11ac packets using 5 GHz band. In FIG. 7, the 11n packet and the 11ac packet represent packets supporting a legacy terminal in a mixed mode (MM) operation, respectively.

As shown in the drawing, the packet 11a is composed of a legacy preamble and legacy data (L-Data). The legacy preamble includes a legacy short training field (L-STF), a legacy long training field (L-LTF), and a legacy signal field (L-SIG). Among them, the L-SIG is modulated using binary phase shift keying (BPSK). On the other hand, the 11n/ac packet includes a legacy preamble as in the 11a packet, and includes the identifiable information of the 11n/ac terminal as a separate preamble after the L-SIG (i.e., an HT preamble and a VHT preamble). The 11a terminal extracts rate information and length information included in the L-SIG of a wireless LAN packet. Based on the extracted information, the terminal regards a portion after the L-SIG as legacy data L-Data and decodes the portion. The legacy data L-Data is modulated using any one of BPSK, quadrature binary phase shift keying (QPSK), 16-quadrature amplitude modulation (16-QAM), and 64-QAM.

On the other hand, the 11n packet may be distinguished from the 11a packet (an IEEE 802.11g packet in case of 2.4 GHz band) based on the modulation scheme used for the high throughput (HT) preamble after the legacy preamble. Referring to FIG. 7, initial symbols 310n and 320n constituting the HT-SIG (e.g., HT-SIG1 and HT-SIG2) of the HT preamble in the 11n packet are modulated using a modulation scheme not used for 11a packets, that is, quadrature binary phase shift keying (QBPSK). The 11n terminal verifies the modulation scheme used for the first symbol 310 after the legacy preamble of a received packet and identifies that the corresponding packet is the 11n packet when the first symbol 310 is modulated using QBPSK. The 11n terminal may additionally check whether or not the QBPSK modulation scheme is used for the second symbol 320 after the legacy preamble of the packet to increase the reliability of packet format verification.

In such a manner, the operation of distinguishing the format of a corresponding packet based on the modulation scheme used for the preamble of the packet is called auto detection. By using the auto detection, the 11n terminal may determine whether the corresponding packet is an 11n packet before a cyclic redundancy check (CRC) process for the HT-SIG of the received packet is performed. Therefore, if the received packet is not an 11n packet, the 11n terminal may reduce power consumption due to unnecessary decoding processes, and reduce a data transmission/reception delay due to an 11a fallback determination.

In a similar manner, the 11ac packet may be distinguished from the 11a packet and the 11n packet based on the modulation scheme used for the VHT preamble after the legacy preamble. However, the preamble configuration of the 11ac packet should minimize the influence on the auto detection process of the 11n terminal described above. That is, it is preferable that a modulation scheme that allows the 11n terminal not to identify the corresponding packet as an 11n packet is used for the first symbol 310c after the legacy preamble in the 11ac packet. Referring to FIG. 7, the first symbol 310c and the second symbol 320c after the legacy preamble in the 11ac packet are modulated using BPSK and QBPSK, respectively. In this case, the first symbol 310c constitutes the VHT-SIG-A1 of the VHT preamble and the second symbol 320c constitutes the VHT-SIG-A2 of the VHT preamble.

The 11ac terminal determines whether the corresponding packet is an 11ac packet based on the modulation scheme used for the first symbol 310 and the second symbol 320 after the legacy preamble of a received packet. That is, the 11ac terminal distinguishes the 11n packet and the non-11n packet based on the modulation scheme used for the first symbol 310 and distinguishes the 11a packet and the 11ac packet among the non-11n packets based on the modulation scheme used for the second symbol 310.

Figure 8:
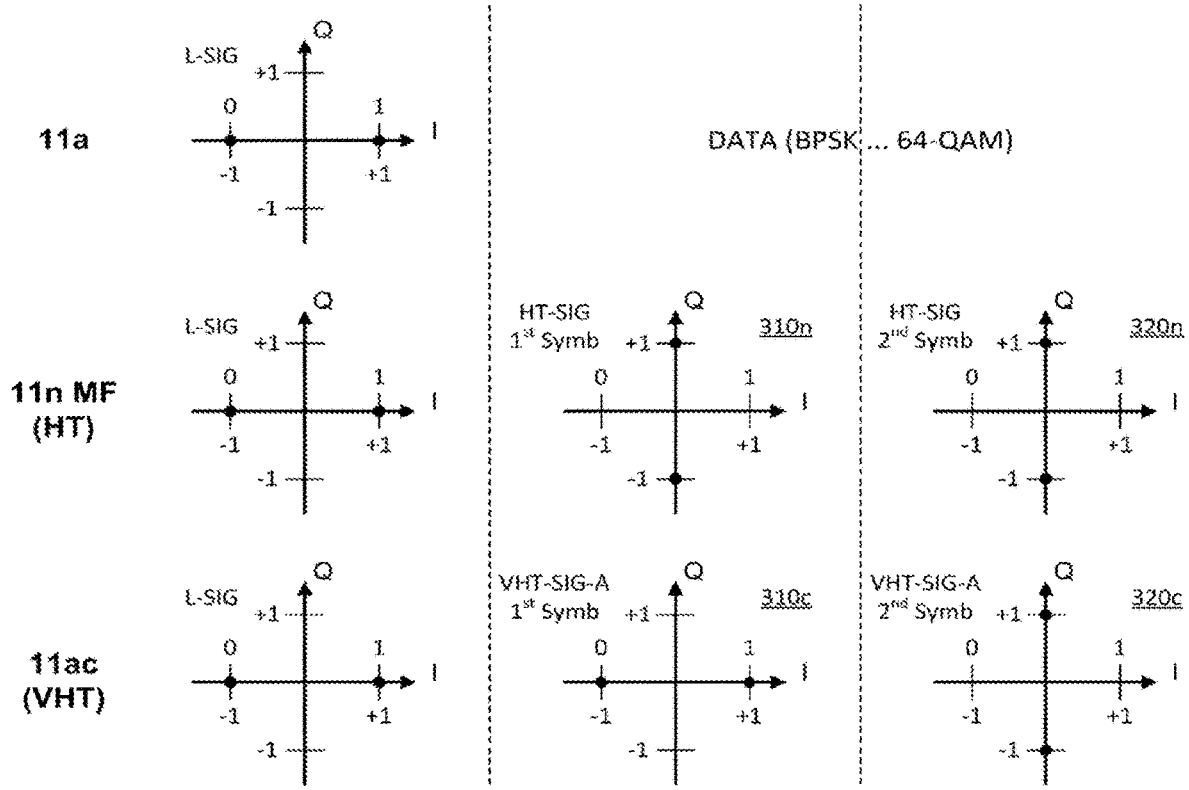
FIG. 8 is a diagram illustrating a symbol specific modulation scheme of L-SIG, HT-SIG, and VHT-SIG-A for auto detection between 802.11a/n/ac packets.

FIG. 8 illustrates a symbol specific modulation scheme of L-SIG, HT-SIG, and VHT-SIG-A for auto detection between 802.11a/n/ac packets.

First, the L-SIGs of the 11a, 11n and 11ac packets are modulated using BPSK. The 11a terminal extracts L-SIG information of a received packet and regards the subsequent symbols as data. Therefore, even when the 11n or 11ac packet is received, the 11a terminal identifies the received packet as the 11a packet. The 11a terminal extracts the length information from the L-SIG of the received packet and performs protection for the received 11n packet or 11ac packet by deferring the transmission/reception operation by the corresponding length.

Next, the first symbol 310*n* and the second symbol 320*n*, that is, HT-SIG, after the L-SIG of the 11n packet are modulated using QBPSK. The 11n terminal verifies the modulation scheme used for the first symbol after the legacy preamble of a received packet and identifies that the corresponding packet is the 11n packet when the first symbol 310 is modulated using QBPSK. Here, the modulation scheme may be verified through the distribution between I/Q channels of the constellation points of subcarriers where each data transmission is performed. Also, the 11n terminal may additionally check whether or not the QBPSK modulation scheme is used for the second symbol after the legacy preamble of the received packet, thereby increasing the reliability of packet format verification.

Next, the first symbol 310*c* after the L-SIG of the 11ac packet is modulated using BPSK, and the second symbol 320*c* is modulated using QBPSK. That is, the first symbol 310*c* and the second symbol 320*c* of the VHT-SIG-A of the 11ac packet are modulated using BPSK and QBPSK, respectively. The 11ac terminal determines whether the corresponding packet is an 11ac packet based on the modulation scheme used for the first symbol and the second symbol after the legacy preamble of a received packet. The 11ac terminal should determine whether the corresponding packet is an 11n packet through the first symbol so that it may clearly verify the packet format when QBPSK modulation is used for the second symbol.

Figure 9:
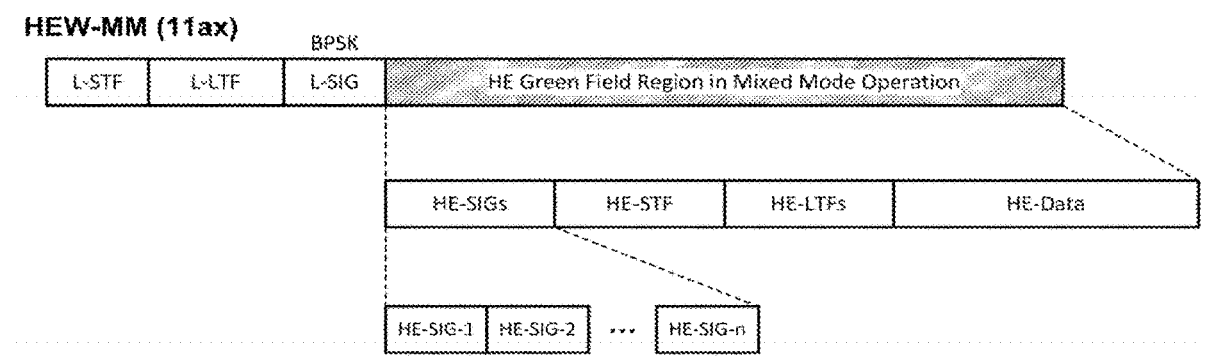
FIG. 9 is a diagram illustrating a structure of an IEEE 802.11ax packet according to an embodiment of the present invention.

FIG. 9 illustrates a structure of an IEEE 802.11ax (hereinafter, referred to as 11ax) packet according to an embodiment of the present invention. In an embodiment of the present invention, a non-legacy wireless LAN mode may represent an IEEE 802.11ax wireless LAN mode, and a legacy wireless LAN mode may represent a wireless LAN mode such as a legacy 11a, 11g, 11n, and 11ac compared to the 11ax. In addition, in the present invention, the packet format may represent information on the wireless LAN communication standard mode used in the packet, that is, information on a communication standard mode such as IEEE 802.11a/g/n/ac/ax.

Referring to FIG. 9, a non-legacy packet (i.e., an 11ax packet) includes a green field that may be designed with a new packet structure identifiable only by a non-legacy terminal (e.g., an 11ax terminal) after the legacy preamble. As described above, the legacy preamble may include L-STF, L-LTF, and L-SIG for compatibility with legacy terminals, and the non-legacy packet may include a high efficiency (HE) preamble and HE data after the L-SIG. The HE preamble includes HE-SIGs consisting of at least one SIG (e.g., HE-SIG-1, HE-SIG-2, . . . , HE-SIG-n) for non-legacy wireless LAN operation, HE-STF and HE-LTFs. Also, various arrangements such as the number and position of each HE-SIG/STF/LTF in the HE preamble are possible. In an embodiment of the present invention, the HE preamble may be referred to as a non-legacy preamble. In this case, in a situation where legacy packets and non-legacy packets coexist, there is a need for an HE preamble structure allowing non-legacy terminals to automatically detect information on non-legacy packets while minimizing the impact on legacy terminals.

Figure 10:
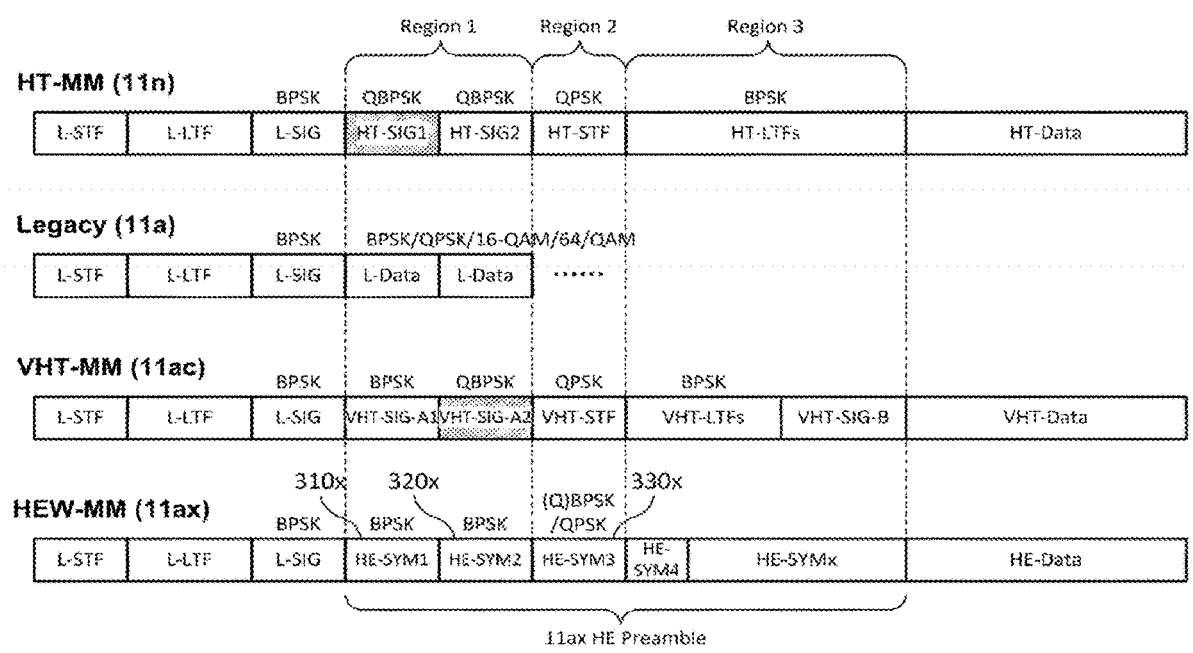
FIG. 10 is a diagram illustrating a comparison between structures of a legacy packet and a non-legacy packet according to an embodiment of the present invention.

FIG. 10 illustrates a comparison between structures of a legacy packet and a non-legacy packet according to an embodiment of the present invention. As described above, legacy packets may include IEEE 802.11a/g/n/ac packets, and non-legacy packets may represent IEEE 802.11ax packets.

As shown in the drawing, the HE preamble of the non-legacy packet is composed of a plurality of symbols. In the present invention, a symbol indicates an orthogonal frequency division multiplexing (OFDM) symbol, and one symbol includes an effective OFDM symbol section and a guard interval section. In addition, in FIG. 10, one symbol of the preamble section may have a length of 4 us, but the present invention is not limited thereto, and the length of the symbol may vary depending on the type of discrete Fourier transform (DFT) used. In the following embodiments, the first symbol, the second symbol, and the third symbol after the L-SIG of the non-legacy packet are referred to as a first symbol 310*x*, a second symbol 320*x*, and a third symbol 330*x*, respectively. That is, the first symbol 310*x*, the second symbol 320*x*, and the third symbol 330*x* represent the first symbol, the second symbol, and the third symbol of the HE preamble, respectively.

Referring to FIG. 10, the HE preamble may be divided into three regions Region 1, Region 2, and Region 3 based on the preambles of 11n and 11ac packets. First, the first region (Region 1) is a first region after the L-SIG, and may include two symbols. In the first region, the 11a packet includes legacy data L-Data, the 11n packet includes HT-SIG, and the 11ac packet includes VHT-SIG, respectively. Therefore, data demodulation is performed in the first region of the 11a packet, and HT-SIG and VHT-SIG demodulations are performed in the first regions of the 11n packet and the 11ac packet, respectively. As described above, legacy terminals (e.g., 11n and 11ac terminals) capable of performing auto detection may distinguish 11n and/or 11ac packets based on the modulation scheme used for the symbols in the first region, and demodulate subsequent packets based on the format of a corresponding packet, that is, the wireless LAN communication standard mode.

According to an embodiment of the present invention, the first symbol 310*x* and the second symbol 320*x* included in the first region in the non-legacy packet may be modulated using BPSK, respectively. Through this, the non-legacy packet may minimize the influence on the auto detection performance of the legacy terminals, that is, the 11n and 11ac terminals. According to an embodiment of the present invention, BPSK modulation may be used for all the subcarriers of the first symbol 310*x* and the second symbol 320*x*, but a modulation scheme other than BPSK may be used for some subcarriers (e.g., subcarriers of even/odd indexes). However, if a different modulation scheme is used for some subcarriers, since the auto detection performance of the 11n/ac terminal is degraded, the use of the different modulation scheme may be allowed only in specified some ranges.

The second region (Region 2) following the first region (Region 1) may include at least one symbol. In the second region, the 11a packet includes legacy data L-Data, the 11n packet includes HT-STF, and the lac packet includes VHT-STF, respectively. Therefore, data demodulation is performed in the second region of the 11a packet as in the first region, and an STF detection process is performed in the second region of the 11n packet and the 11ac packet based on the repetition characteristics of a time domain signal. In this case, the symbols of the second region of the 11n packet and the 11ac packet are modulated using QPSK.

As in the above-mentioned embodiment, when the symbols of the first region of a non-legacy packet, that is, the first symbol 310*x* and the second symbol 320*x* are modulated using BPSK, the 11n and 11ac terminals may regard the corresponding packet as the 11a packet. Therefore, the modulation scheme used for the symbol of the second region of a packet has a negligible effect on the auto detection processes of the 11n terminal and the 11ac terminal. Therefore, according to an embodiment of the present invention, various modulation schemes may be used for the symbol of the second region of a non-legacy packet, that is, the third symbol 330x. For example, modulation such as BPSK, QBPSK or QPSK may be used for the third symbol 330x of a non-legacy packet. According to an embodiment, the third symbol 330x of a non-legacy packet may be modulated using QBPSK. In such a way, when QBPSK having orthogonal characteristics with respect to BPSK is used for the modulation of the third symbol 330x, the non-legacy packet may be distinguished from the 11a/g packet. In this case, the non-legacy terminal verifies that the first symbol, the second symbol, and the third symbol after the L-SIG of a received packet are modulated using BPSK, BPSK, and QBPSK, respectively, so that the non-legacy terminal may identify that the corresponding packet is a non-legacy packet. However, the auto detection method of a non-legacy terminal in an embodiment of the present invention is not limited to this, and the auto detection of a non-legacy packet may be performed based on various embodiments described later.

Next, the third region (Region 3) represents the remaining preamble section after the second region (Region 2). In the third region, the 11n packet includes HT-LTF, and the 11ac packet includes VHT-LTF and VHT-SIG-B, respectively. The symbols in this region are modulated using BPSK. According to a further embodiment of the present invention, the third region of a non-legacy packet may be modulated using QBPSK, which is distinguished from legacy packets such as 11a/n/ac, and a non-legacy terminal may perform the auto detection of a corresponding packet based on a modulation scheme used for the third region of a non-legacy packet. That is, the modulation scheme of the third region of a non-legacy packet may be used for packet auto detection and additional information transmission of a non-legacy terminal. In this case, at least a part of the modulation scheme and the preamble configuration of the first region and the second region of a non-legacy packet may be set to be identical to those of the legacy packet.

Figure 11:
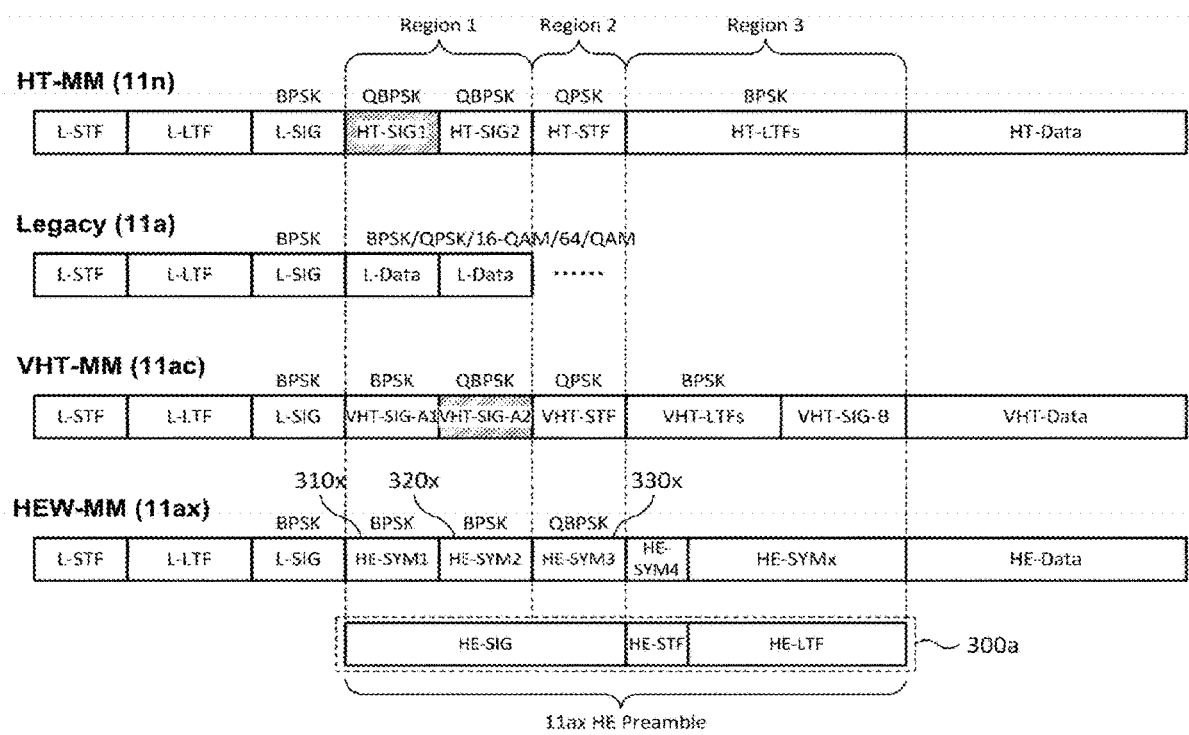
FIGS. 11 to 13 are diagrams illustrating a preamble structure of a non-legacy packet according to an embodiment of the present invention.
Figure 12:
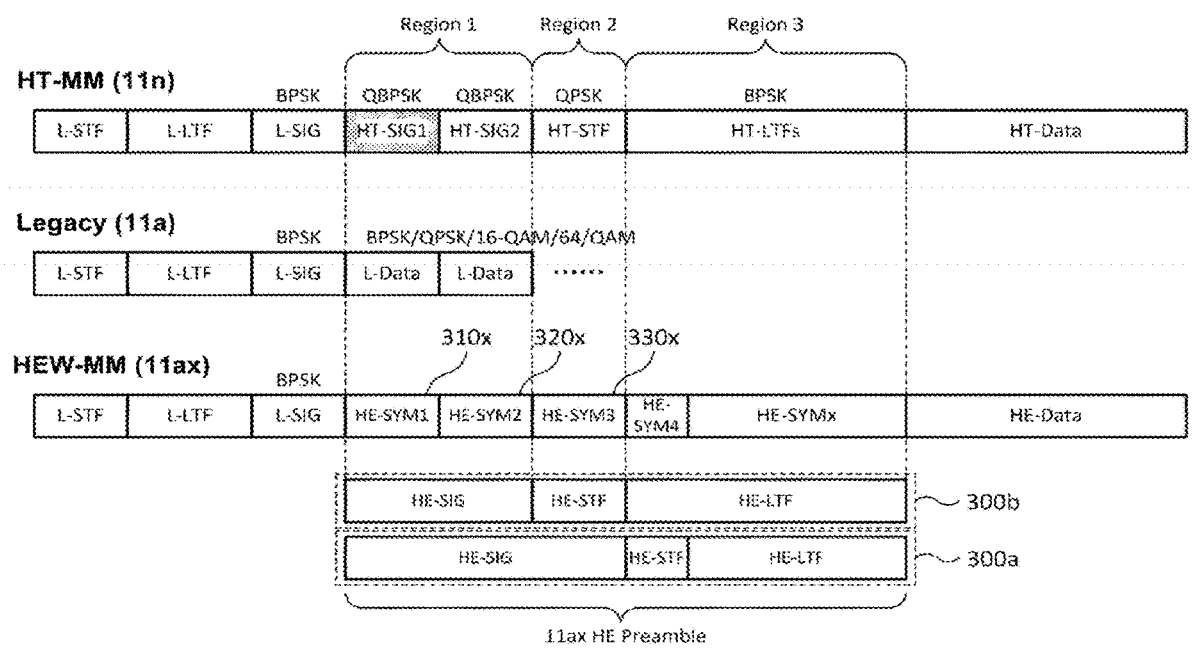
Figure 13:
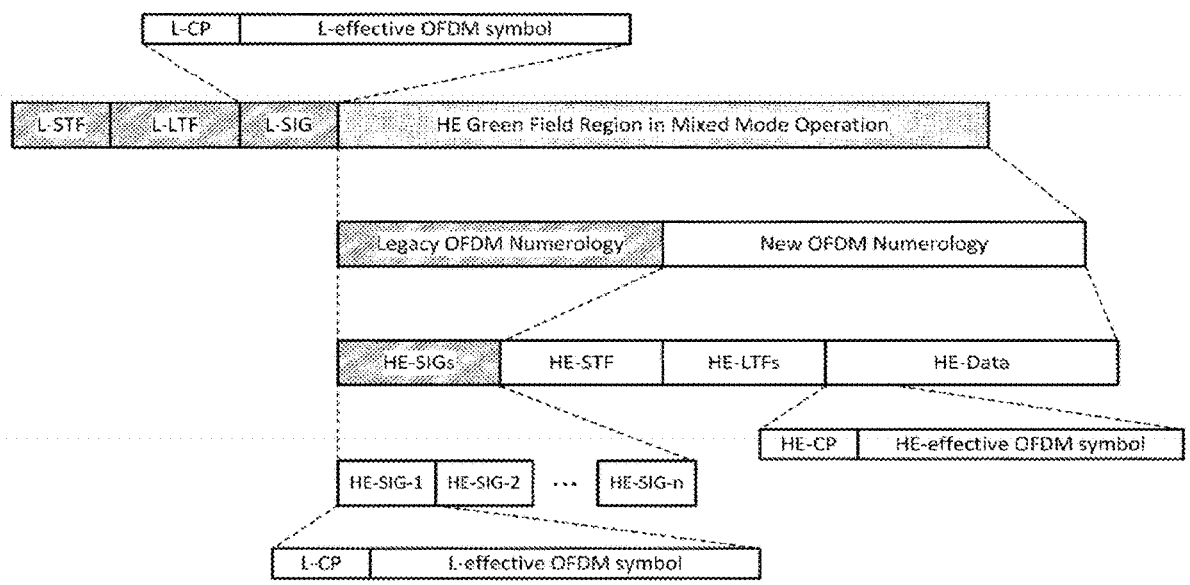

FIGS. 11 to 13 illustrate a preamble structure of a non-legacy packet according to an embodiment of the present invention. According to an embodiment of the present invention, a processor of a terminal generates a packet according to embodiments described later, and transmits the generated packet through a transceiver. In each embodiment of FIGS. 11 to 13, the same or corresponding parts as those of the embodiment of the previous drawings will be omitted.

First, FIG. 11 illustrates an embodiment of a preamble configuration of a non-legacy packet according to the present invention. Referring to FIG. 11, the non-legacy packet includes a legacy preamble and an HE preamble 300a. The HE preamble 300a includes a high efficiency signal field (HE-SIG), a high efficiency short training field (HE-STF), and a high efficiency long training field (HE-LTF). In an embodiment of the present invention, the HE-SIG, the HE-STF, and the HE-LTF may be referred to as a non-legacy SIG, a non-legacy STF and a non-legacy LTF, respectively.

According to the basic structure of FIG. 11, the HE-SIG may include a first symbol 310x, a second symbol 320x, and a third symbol 330x. According to the embodiment of FIG. 11, the first symbol 310x and the second symbol 320x are modulated using BPSK, and the third symbol 330x is modulated using QBPSK. In this case, the non-legacy packet may be distinguished from the 11n packet through the first symbol 310x modulated using BPSK, and may be distinguished from the 11ac packet through the second symbol 320x modulated using BPSK. In addition, the non-legacy packet may be distinguished from the 11a/g packet through the third symbol 330x modulated using QBPSK. In such a way, the HE-SIG of the non-legacy packet may be composed of three or more symbols, and may further include an additional SIG if necessary. A specific embodiment of this will be described with reference to FIG. 13.

According to a further embodiment of FIG. 11, the modulation scheme used for a specific symbol constituting the HE-SIG may indicate the configuration and sequence of the HE preamble 300a. As described later, a part (e.g., HE-SIG-B) of the configuration of the HE-SIG may be selectively included in the HE preamble 300a, and according thereto, the length of the HE-SIG is variable. According to one embodiment, whether or not a specific modulation scheme is used for the third symbol 330x may indicate whether the partial configuration is included. According to the embodiment of FIG. 11, when QBPSK modulation is used for the third symbol 330x, the HE-SIG may be composed of three symbols and followed immediately by the HE-STF. That is, when QBPSK modulation is used for the third symbol 330x, the fourth symbol of the HE preamble 330a may constitute the HE-STF. However, the embodiment of FIG. 11 shows an embodiment for determining the configuration and sequence of the HE preamble 300a, and the present invention is not limited thereto.

FIG. 12 illustrates another embodiment of a preamble configuration of a non-legacy packet according to the present invention. According to another embodiment of the present invention, the HE-SIG of a non-legacy packet may have a variable length. FIG. 12 shows an HE preamble 300a having an HE-SIG composed of three symbols, and an HE preamble 300b having an HE-SIG composed of two symbols.

The HE-SIG may be set to a variable length according to various embodiments. As described later, the HE-SIG may be composed of a plurality of SIGs, and the length of HE-SIG may vary depending on whether an additional SIG is included or not. Also, the HE-SIG may have a variable length depending on the frequency band in which the corresponding packet is used. For example, the HE preamble 300b of the non-legacy packet in the first frequency band (e.g., the 2.4 GHz band) where no 11ac packet is transmitted may include an HE-SIG composed of two symbols 310x and 320x. According to an embodiment, the first symbol 310x and the second symbol 320x constituting the HE-SIG of the HE preamble 300b may be modulated using BPSK and QBPSK, respectively. If the first symbol 310x and the second symbol 320x of the HE preamble 300b of a non-legacy packet are modulated in the same manner as the 11ac packet, a terminal may determine the non-legacy packet by using the same auto detection method for 11ac packet in the first frequency band (e.g., the 2.4 GHz band). On the other hand, in the second frequency band (i.e., the 5 GHz band) in which the 11ac packet is transmitted, the HE-SIG of the HE preamble 300a of a non-legacy packet may further include an additional SIG composed of the third symbol 330x in addition to the HE-SIG used in the HE preamble 300b in the first frequency band. In this case, the non-legacy terminal can determine the non-legacy packet through the modulation scheme used for the third symbol 330x of the HE preamble 300a or transmission data of the corresponding symbol. On the other hand, the 11ac terminal receiving the HE preamble 300a of the non-legacy packet may determine that the corresponding packet is not the 11ac packet through the error occurring in the decoding process of the VHT-SIG1.

Moreover, although it is shown in FIG. 12 that the length of the HE-SIG varies by two symbols or three symbols, the present invention is not limited thereto and the HE-SIG may be set to a length longer than that. A specific embodiment of this will be described with reference to FIG. 13.

FIG. 13 illustrates a preamble configuration of a non-legacy packet in more detail according to an embodiment of the present invention. As shown in FIG. 13, the non-legacy packet includes a legacy preamble, a non-legacy preamble (i.e., an HE preamble), and non-legacy data (i.e., HE data). The legacy preamble includes an L-STF, an L-LTF, and an L-SIG. In addition, the HE preamble includes HE-SIGs composed of at least one SIG (e.g., HE-SIG-1, HE-SIG-2, . . . , HE-SIG-n), an HE-STF, and HE-LTFs. According to an embodiment of the present invention, the HE-SIGs of the HE preamble may be composed of a plurality of SIGs (e.g., HE-SIG-1, HE-SIG-2, . . . , HE-SIG-n). More specifically, the HE-SIGs may include a repeated L-SIG and HE-SIG-A, and additionally include an HE-SIG-B, a repeated HE-SIG-A, and the like.

First, the HE-SIGs may include a repeated L-SIG (i.e., RL-SIG) as the first SIG (i.e., HE-SIG-1). The RL-SIG is composed of the first symbol after the L-SIG, and at least a part of which is identical to information of the L-SIG. According to an embodiment of the present invention, the non-legacy terminal may automatically detect that the corresponding packet is a non-legacy packet through the RL-SIG of the received packet. That is, when the RL-SIG with repeated information of the L-SIG is detected after the L-SIG of the received packet, the non-legacy terminal may determine that the corresponding packet is a non-legacy packet. According to an embodiment of the present invention, the RL-SIG may be modulated using the same modulation scheme as the L-SIG, i.e., BPSK.

Next, the HE-SIGs may include HE-SIG-A as the second SIG (i.e., HE-SIG-2). The HE-SIG-A is composed of two symbols and includes an HE-SIG-A1 and an HE-SIG-A2. In this case, the HE-SIG-A may be composed of a second symbol and a third symbol after the L-SIG. According to an embodiment of the present invention, the second symbol and the third symbol constituting the HE-SIG-A may be modulated using BPSK and QBPSK, respectively. As a method for performing the auto detection by the non-legacy terminal, by verifying that the first symbol, the second symbol, and the third symbol after the L-SIG of the received packet are modulated using BPSK, BPSK, and QBPSK, respectively, it may be determined that the corresponding packet is a non-legacy packet.

Meanwhile, according to an embodiment of the present invention, the third symbol of the HE preamble may be modulated by a scheme other than QBPSK, and the modulation scheme used for the third symbol may be used to represent additional information of the non-legacy packet. For example, the modulation scheme used for the third symbol of the HE preamble may represent whether the HE preamble of the non-legacy packet includes an additional SIG, for example, the HE-SIG-B. The third symbol may be modulated using one of BPSK, QBPSK, and QPSK. Among them, if the first modulation scheme is used, it may indicate that the HE preamble includes the HE-SIG-B, and if the second modulation scheme different from the first modulation scheme is used, it may indicate that the HE preamble does not include the HE-SIG-B. According to an embodiment, the third symbol may be modulated using QPSK when the HE preamble includes the HE-SIG-B, and the third symbol may be modulated using QBPSK when the HE preamble does not include the HE-SIG-B. Thus, when the third symbol is modulated using QBPSK, the HE-STF in the HE preamble may immediately follow the HE-SIG-A (or repeated HE-SIG-A). However, in the present invention, the specific configuration of the HE preamble according to the modulation scheme of the third symbol is not limited thereto and may be implemented in the opposite embodiment or another embodiment. That is, the third symbol may be modulated using QBPSK when the HE preamble includes the HE-SIG-B, and the third symbol may be modulated using BPSK when the HE preamble does not include the HE-SIG-B.

Next, the HE-SIGs may additionally include repeated HE-SIG-A (i.e., RHE-SIG-A). The RHE-SIG-A is composed of two symbols, and includes an RHE-SIG-A1 and an RHE-SIG-A2. The RHE-SIG-A is set to have at least a part of information identical to that of the HE-SIG-A1, and the RHE-SIG-A2 is set to have at least a part of information identical to that of the HE-SIG-A2. In addition, the HE-SIG may further include the HE-SIG-B. The HE-SIG-B is composed of at least one symbol and has a variable length. According to an embodiment of the present invention, the HE-SIG may selectively include the RHE-SIG-A and/or the HE-SIG-B. In this case, information on at least one of whether or not the RHE-SIG-A is included in the HE-SIG and whether or not the HE-SIG-B is included in the HE-SIG may be indicated through the modulation scheme used for a specific symbol of the HE preamble, for example, the modulation scheme used for the third symbol of the HE preamble.

As taken together with the above-described embodiments, the HE-SIGs of the present invention may be modified into the following types of configurations (i.e. elements) and sequences. Hereinafter, the fourth symbol, the fifth symbol and the sixth symbol indicate the fourth symbol, the fifth symbol and the sixth symbol after the L-SIG of the non-legacy packet, respectively.

1) In case that the HE-SIG includes the RL-SIG and the HE-SIG-A. The HE-SIGs are composed of three symbols and include the RL-SIG (i.e., first symbol), the HE-SIG-A1 (i.e., second symbol) and the HE-SIG-A2 (i.e., third symbol).

2) In case that the HE-SIG includes the RL-SIG, the HE-SIG-A, and the RHE-SIG-A. The HE-SIGs are composed of five symbols, and the following two types are possible. 2-1) the RL-SIG (i.e., first symbol), the HE-SIG-A1 (i.e., second symbol), the HE-SIG-A2 (i.e., third symbol), the RHE-SIG-A1 (i.e., fourth symbol), and the RHE-SIG-A2 (i.e., fifth symbol). 2-2) the RL-SIG (i.e., first symbol), the HE-SIG-A1 (i.e., second symbol), the RHE-SIG-A1 (i.e., third symbol), the HE-SIG-A2 (i.e., fourth symbol), and the RHE-SIG-A2 (i.e., fifth symbol).

3) In case that the HE-SIG includes the RL-SIG, the HE-SIG-A, and the HE-SIG-B. The HE-SIGs have variable length and include the RL-SIG (i.e., first symbol), the HE-SIG-A1 (i.e., second symbol), the HE-SIG-A2 (i.e., third symbol), and the HE-SIG-B (i.e., fourth+symbol).

4) In case that the HE-SIG includes the RL-SIG, the HE-SIG-A, the RHE-SIG-A, and the HE-SIG-B. The HE-SIGs have variable length, and the following two types are possible. 4-1) the RL-SIG (i.e., first symbol), the HE-SIG-A1 (i.e., second symbol), the HE-SIG-A2 (i.e., third symbol), the RHE-SIG-A1 (i.e., fourth symbol), the RHE-SIG-A2 (i.e., fifth symbol), and the HE-SIG-B (i.e., sixth+symbol). 4-2) the RL-SIG (i.e., first symbol), the HE-SIG-A1 (i.e., second symbol), the RHE-SIG-A1 (i.e., third symbol), the HE-SIG-A2 (i.e., fourth symbol), the RHE-SIG-A2 (i.e., fifth symbol), and the HE-SIG-B (i.e., sixth+ symbol).

The HE preamble may include the HE-SIGs in the type described above and the HE-STF and the HE-LTF, which follow the HE-SIGs. As described above, the HE preamble of the non-legacy packet may have any one of a plurality of types of configurations and sequences. According to an embodiment of the present invention, the configuration and/or sequence of the HE preamble may be indicated through a modulation scheme used for a specific symbol of the HE preamble, for example, a modulation scheme used for the third symbol of the HE preamble.

On the other hand, referring to FIG. 13, a symbol structure (e.g., OFDM Numerology) different from that of the legacy preamble may be used for the HE preamble and the HE data of the non-legacy packet. Here, the symbol structure indicates the lengths of the effective OFDM symbol section and the guard interval (or cyclic prefix) section, the subcarrier spacing of the OFDM signal, the number of guard carriers, and the number of FFT points used for OFDM symbol configuration, and the like. As described above, each symbol constituting a packet includes an effective OFDM symbol section and a guard interval (or cyclic prefix) section. In this case, it is preferable that a relatively long cyclic prefix (CP) is used in a channel environment having a large delay spread as in the outdoor, and a relatively short CP is used in a channel environment having a small delay spread as in a room.

In the case of a legacy symbol used in legacy packets such as 11a/g/n/ac, one symbol is composed of an effective OFDM symbol (L-effective OFDM symbol) of 3.2 us and a CP (i.e., L-CP) of 0.8 us or 0.4 us. That is, the legacy symbol has a CP overhead of about 20% (=0.8/4.0) or 11.1% (=0.4/3.6) based on the OFDM symbol length of 4 us or 3.6 us. However, the non-legacy symbol used in the non-legacy packet may set the length of the effective OFDM symbol section to be long while maintaining a similar length of the CP section, thereby reducing the CP overhead. To this end, the non-legacy terminal may implement it by reducing the subcarrier spacing of the OFDM signal used for the HE preamble of the non-legacy packet. For example, if a subcarrier spacing of 78.125 kHz through 256 FFT is used instead of a subcarrier spacing of 312.5 kHz through the existing 64 FFT, the length of the effective OFDM symbol (i.e., HE-effective OFDM symbol) section of the non-legacy symbol will have 12.8 us (=3.2 us*4) that is increased by 4 times. In this case, the length of the CP (i.e., HE-CP) section of the non-legacy symbol may be set to any one of 0.4/0.8/1.6/3.2/6.4 us, and the length of the non-legacy symbol including the effective OFDM symbol section may be set to any one of 13.2/13.6/14.4/16/19.2 us. Therefore, each CP overhead of the non-legacy symbol is 3.03/5.88/11.1/20/33.3%, which may provide the data throughput improvement effect by up to about 17% compared with the legacy symbol.

According to an embodiment of the present invention, a legacy symbol structure is used for the symbols of the HE-SIG in the HE preamble of a non-legacy packet, and a non-legacy symbol structure different from the legacy symbol structure may be used for the symbols from the HE-STF after the HE-SIG. According to an embodiment, the non-legacy packet may indicate at least some information (e.g., length information of the CP section) of the non-legacy symbol structure through additional information of the legacy preamble. A specific embodiment relating to this will be described later.

Figure 14:
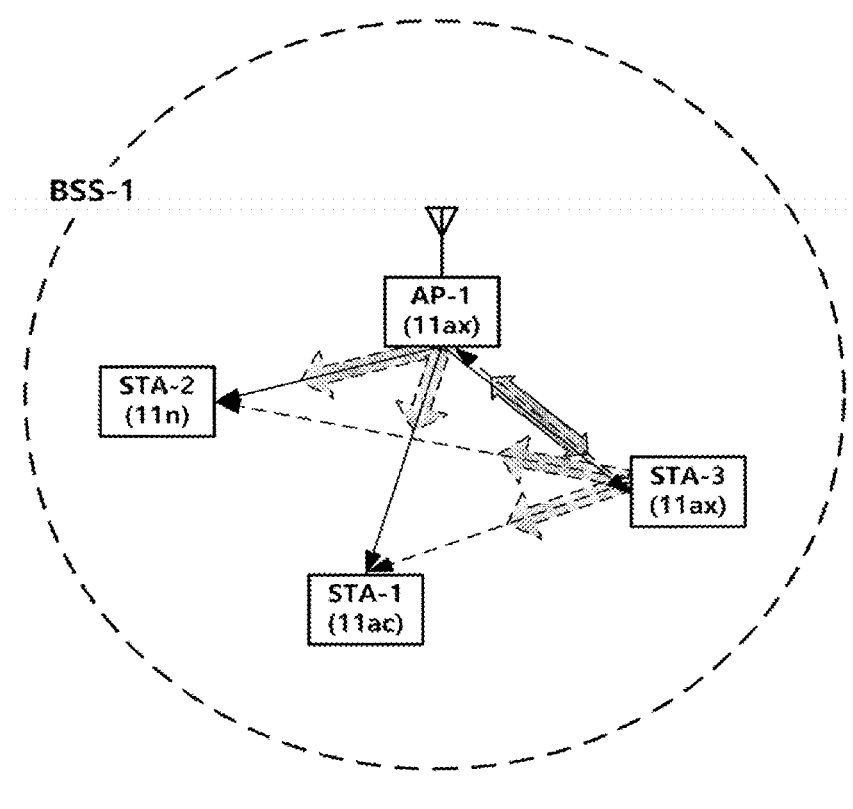
FIGS. 14 to 16 are diagrams illustrating a method of transmitting and receiving data according to a mixed mode (MM) in an environment in which a legacy terminal and a non-legacy terminal coexist according to another embodiment of the present invention.
Figure 15:
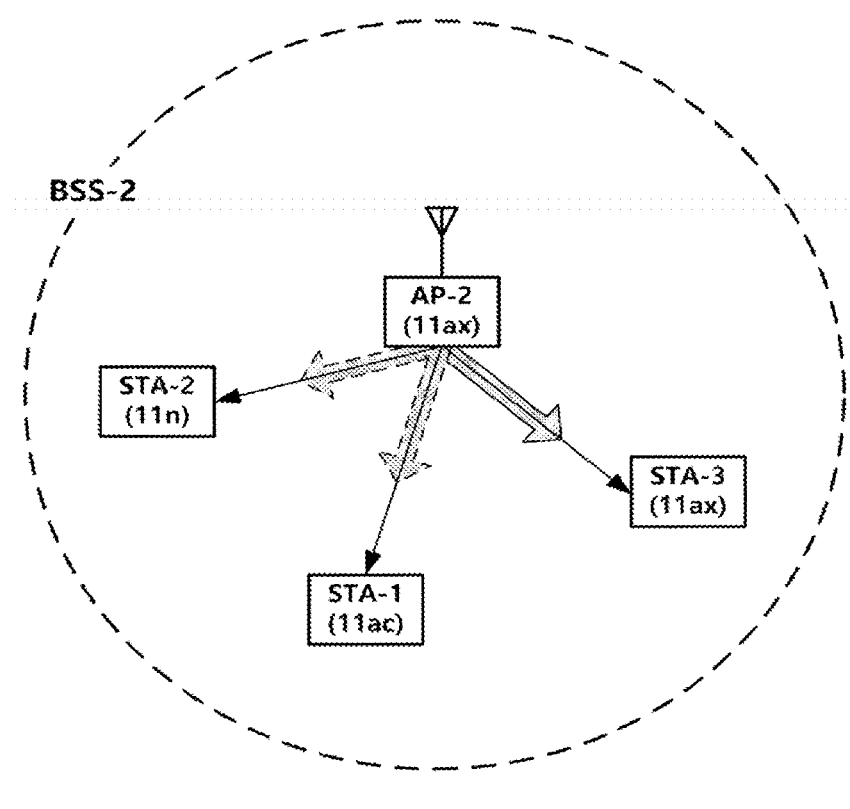
Figure 16:
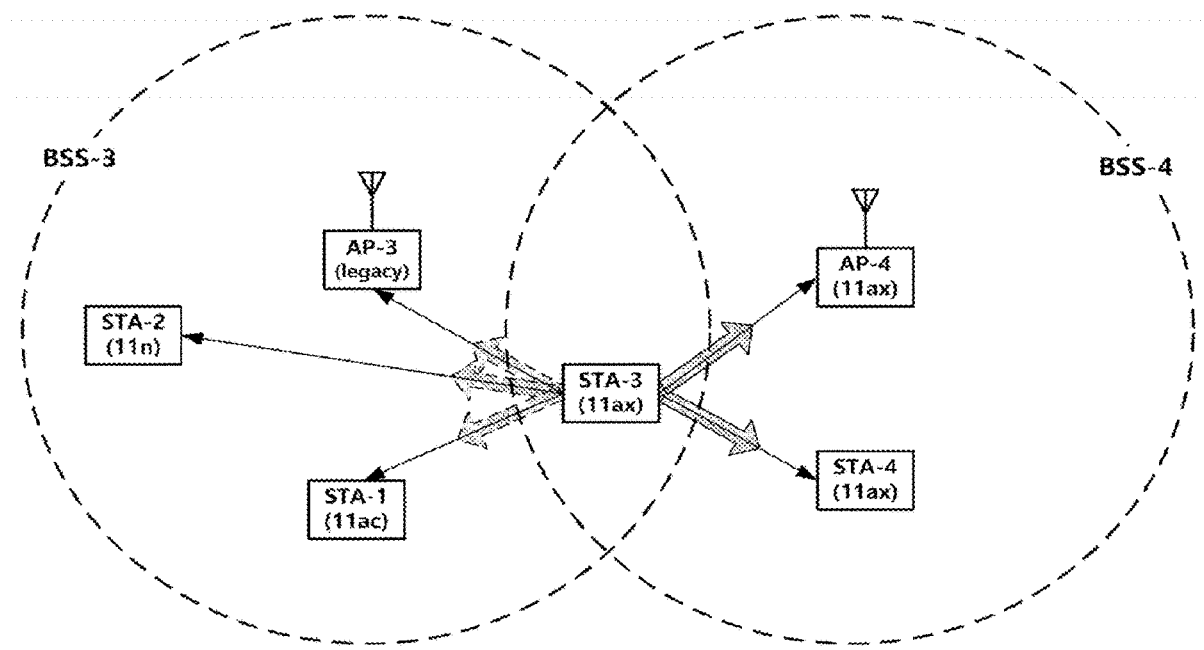

FIGS. 14 to 16 illustrate a method of transmitting and receiving data according to a mixed mode (MM) in an environment in which a legacy terminal and a non-legacy terminal coexist according to another embodiment of the present invention.

First, FIG. 14 shows a situation of transmitting and receiving uplink/downlink packets between a non-legacy AP and a non-legacy STA. Referring to FIG. 14, STA-1, STA-2, and STA-3 are associated with BSS-1 operated by AP-1. Among them, the AP-1 and the STA-3 are non-legacy terminals, and the STA-1 and the STA-2 are 11ac and/or 11n terminals, respectively, which are legacy wireless LAN modes. In the embodiment of FIG. 14, the non-legacy terminal AP-1 and STA-3 transmit and receive non-legacy packets. In FIG. 14, a solid line arrow indicates a non-legacy downlink packet transmitted from the AP-1 to the STA-3, and a dotted arrow indicates a non-legacy uplink packet transmitted from the STA-3 to the AP-1.

When the AP-1 and the STA-3 transmit and receive non-legacy packets, corresponding packets may also be received by the STA-1 and the STA-2. However, since the legacy terminals STA-1 and STA-2 are not able to identify the non-legacy wireless LAN mode, they identify the corresponding packets in a predetermined wireless LAN mode. That is, the STA-1 and the STA-2 identify the corresponding packets as 11a/g packets based on the preamble information of the received non-legacy packet and operate in a fallback mode.

According to an embodiment of the present invention, in such a mixed mode, additional information for non-legacy terminals (hereinafter, non-legacy additional information) may be included in non-legacy packets in order for effective data transmission and reception of non-legacy terminals. According to an embodiment, the non-legacy additional information may be included in the legacy preamble of a non-legacy packet. In FIG. 14, a solid line block arrow indicates that a terminal receiving a non-legacy packet is able to decode the non-legacy additional information included in the corresponding packet, and the dotted block arrow indicates that the terminal is not able to decode the non-legacy additional information. As shown in the drawing, the non-legacy terminals AP-1 and STA-3 obtain non-legacy additional information included in the non-legacy packet, and perform data transmission/reception using the non-legacy additional information. However, the legacy terminals STA-1 and STA-2 may not identify the non-legacy additional information included in the non-legacy packet and there is no change in the operation of the existing legacy wireless LAN mode.

Next, FIG. 15 shows a situation in which the non-legacy AP transmits downlink packets to the legacy STA. Referring to FIG. 15, STA-1, STA-2, and STA-3 are associated with BSS-2 operated by AP-2. Among them, the AP-2 and the STA-3 are non-legacy terminals, and the STA-1 and the STA-2 are 11ac and/or 11n terminals, respectively, which are legacy wireless LAN modes. In the embodiment of FIG. 15, the non-legacy terminal AP-2 transmits a legacy packet in order for communication with the legacy terminal STA-1. A solid line arrow shown in FIG. 15 indicates an 11ac packet transmitted from the AP-2 to the STA-1.

When the AP-2 transmits an 11ac packet to the STA-1, the corresponding packet may also be received by the STA-2 and the STA-3. However, since the STA-2, which is the 11n terminal, is not able to identify the 11ac packet, it identifies the received packet as the 11a/g packet and operates in a fallback mode. Meanwhile, the non-legacy terminal STA-3 may identify the 11ac packet, and also extract non-legacy additional information when the corresponding packet includes the non-legacy additional information. Therefore, according to an embodiment of the present invention, when a non-legacy terminal transmits a packet to a legacy terminal, it may transmit a legacy packet including non-legacy additional information. According to an embodiment of the present invention, the non-legacy additional information may be included in the legacy preamble of a legacy packet. In FIG. 15, a solid line block arrow indicates that a terminal receiving a legacy packet is able to decode the non-legacy additional information included in the corresponding packet, and a dotted block arrow indicates that the terminal is not able to decode the non-legacy additional information. As shown in the drawing, the STA-3, which is a non-legacy terminal, obtains non-legacy additional information included in the legacy packet, and performs data transmission/reception using the non-legacy additional information. However, the legacy terminals STA-1 and STA-2 may not identify the non-legacy additional information included in the legacy packet and there is no change in the operation of the existing legacy wireless LAN mode.

Next, FIG. 16 shows a situation in which the non-legacy STA transmits uplink packets to the legacy AP. Referring to FIG. 16, STA-1, STA-2, and STA-3 are associated with BSS-3 operated by AP-3, and STA-4 is associated with BSS-4 operated by AP-4. Among them, the AP-4, the STA-3, and the STA-4 are non-legacy terminals, and the STA-1 and the STA-2 are 11ac and/or 11n terminals, respectively, which are in legacy wireless LAN modes. In addition, the AP-3 is a legacy terminal, and indicates a terminal in any one of 11a/g/n/ac wireless LAN modes. In the embodiment of FIG. 16, the non-legacy terminal STA-3 transmits a legacy packet in order for communication with the legacy terminal AP-3. A solid line arrow shown in FIG. 16 indicates any one of 11a/g/n/ac packets transmitted from the STA-3 to the AP-3.

When the STA-3 transmits a legacy packet to the AP-3, the corresponding packet may also be received by the adjacent terminals, i.e., the STA-1, the STA-2, the STA-4, the AP-4, and so on. When the non-legacy terminal STA-3 transmits a legacy packet including non-legacy additional information as in the embodiment of FIG. 15, the non-legacy terminals AP-4 and STA-4 may obtain the non-legacy additional information included in the received packet. The non-legacy terminals may perform data transmission/reception by using the obtained information.

Figure 17:
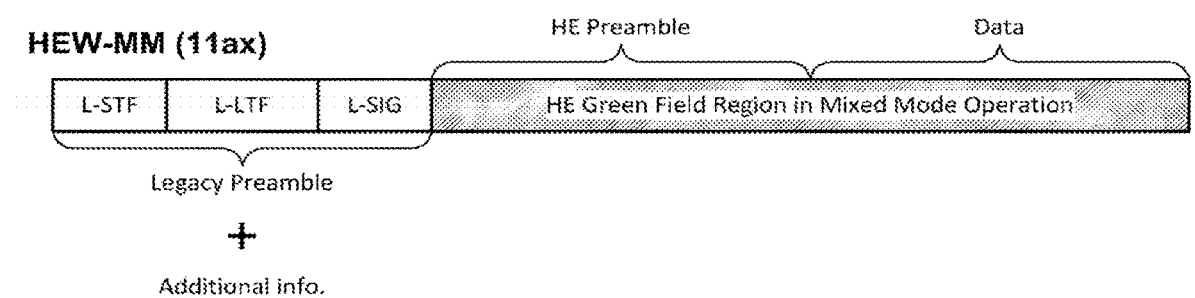
FIG. 17 is a diagram illustrating a structure of a non-legacy packet including non-legacy additional information according to an embodiment of the present invention.

FIG. 17 illustrates a structure of a non-legacy packet including non-legacy additional information according to an embodiment of the present invention. According to an embodiment of the present invention, a processor of a non-legacy terminal may generate non-legacy packets according to the embodiment of FIG. 17 and transmit the generated packets through a transceiver. The non-legacy packet according to the embodiment of FIG. 17 may be used for data communication between the non-legacy terminals as in the scenario of FIG. 14.

Referring to FIG. 17, the non-legacy terminal generates a non-legacy packet including a legacy preamble and a non-legacy preamble (i.e., HE preamble), and transmits the generated packet. As described above, the legacy preamble includes the L-STF, the L-LTF, and the L-SIG, and is identifiable by legacy terminals including 11a/g terminals. According to the embodiment of FIG. 17, non-legacy additional information for non-legacy terminals may be further included in the legacy preamble of the non-legacy packet transmitted by the non-legacy terminal. The non-legacy additional information may be extracted and decoded by the non-legacy terminals but is unidentifiable information in the legacy terminals. According to an embodiment of the present invention, the non-legacy additional information included in the legacy preamble of the non-legacy packet may include at least one of the following listed information.

1) Non-legacy wireless LAN mode (i.e., 11ax) indicator. First, the non-legacy additional information may include the wireless LAN communication standard mode information used in the corresponding packet. When the non-legacy additional information of the received packet indicates a non-legacy wireless LAN mode, the non-legacy terminal may omit or simplify the auto detection process for determining whether the received packet is one of legacy wireless LAN modes, that is, 11a/g/n/ac. According to an embodiment of the present invention, the non-legacy additional information of the legacy preamble may include the repeated L-SIG (i.e., RL-SIG) described above in FIG. 13. The non-legacy packet may include an RL-SIG set to have at least a part of information identical to that of the L-SIG of the legacy preamble. The non-legacy terminal may identify that the corresponding packet is a non-legacy packet through the detection of the RL-SIG. When the information indicating that the received packet is a non-legacy wireless LAN packet is extracted through the legacy preamble of the corresponding packet, the non-legacy terminal can immediately process the area after the legacy preamble of the received packet in the non-legacy wireless LAN mode.

2) Symbol structure (e.g. OFDM Numerology) of non-legacy symbols. Next, the non-legacy additional information may include symbol structure information of a non-legacy symbol used in a specific area after the legacy preamble. As described above, a symbol structure (e.g., OFDM Numerology) different from that of a legacy preamble may be used for the non-legacy preamble and non-legacy data of a non-legacy packet. Here, the symbol structure indicates the lengths of the effective OFDM symbol section and the guard interval (or cyclic prefix) section, the subcarrier spacing of the OFDM signal, the number of guard carriers, and the number of FFT points used for OFDM symbol configuration, and the like. According to an embodiment, the non-legacy packet may indicate at least some information (e.g., length information of the CP section) of the non-legacy symbol structure through non-legacy additional information. In such a way, when the non-legacy symbol structure information is extracted through the legacy preamble of the non-legacy wireless LAN packet, the non-legacy terminal may quickly set the OFDM symbol synchronization, the FFT size, and the length of CP section fast, thereby reducing the implementation complexity of the non-legacy terminal.

3) Configuration and/or sequence information of non-legacy preamble. Next, the non-legacy additional information may include information indicating at least one of a configuration (i.e. elements) and sequence of a non-legacy preamble. As described above with reference to FIG. 13, the configuration and sequence in the non-legacy preamble of the non-legacy packet may be modified into various forms. According to an embodiment of the present invention, the structure information of a non-legacy preamble may be delivered through the non-legacy additional information of a legacy preamble. For example, the non-legacy additional information may indicate the number of symbols constituting the HE-SIG of the non-legacy preamble. In this case, the non-legacy terminal may immediately perform a decoding process such as CRC check based on the obtained symbol number information. Accordingly, the non-legacy terminal may reduce unnecessary operations such as blind decoding and auto detection, thereby reducing power consumption and obtaining non-legacy wireless LAN information more quickly. In addition, non-legacy additional information may provide various information to support effective operations of the non-legacy terminal. The various information may include information on the number of symbols constituting the HE-STF and the HE-LTF of a non-legacy preamble, the presence or absence of additional SIGs (e.g., HE-SIG-B and RHE-SIG-A), and a method for analyzing bit information of each configuration of a non-legacy preamble.

4) Additional information for Clear Channel Assessment (CCA) operation of non-legacy terminal. Next, the non-legacy additional information may include a parameter for the CCA operation of a non-legacy terminal or information for setting the parameter. According to a further embodiment of the present invention, a CCA threshold value (i.e., first CCA threshold) used for the CCA operation of a non-legacy terminal may be set to have a higher level than a CCA threshold value (i.e., second CCA threshold) used for the CCA operation of a legacy terminal. The non-legacy terminal may set the CCA threshold value based on the specific information of the received packet, for example, the BSS identifier information. Here, the BSS identifier information may indicate the BSSID or its abbreviated information. According to an embodiment, when the BSS identifier information of the received packet is same as the BSS identifier information of the corresponding terminal, the non-legacy terminal performs a CCA operation using the second CCA threshold value. When the BSS identifier information of the received packet is different from the BSS identifier information of the corresponding terminal, the non-legacy terminal may perform a CCA operation using the first CCA threshold value higher than the second CCA threshold value. In this case, the BSS identifier information of the received packet may be extracted from the non-legacy additional information.

Also, according to another embodiment of the present invention, the non-legacy additional information may include additional information for setting the CCA operation of the non-legacy terminal. That is, the non-legacy additional information may include information indicating whether the CCA operation of the non-legacy terminal is performed in the same manner as the CCA operation of the legacy terminal or is performed by using a new parameter. In this case, information for setting a new parameter may be included in the HE-SIG of the non-legacy preamble. For example, the BSS identifier information may be included in the HE-SIG of the non-legacy preamble. In addition, an indicator of whether the CCA threshold value for the CCA operation of the non-legacy terminal to be set based on the BSS identifier information or to be set as the legacy CCA threshold value may be included in the non-legacy additional information of the legacy preamble. According to another embodiment of the present invention, the non-legacy additional information may include offset information for a CCA Signal Detection (SD)/Energy Detection (ED) threshold value, and the non-legacy terminal may extract the offset information to perform the CCA operation more quickly.

5) Bandwidth extension and channel allocation information. Finally, the non-legacy additional information may include bandwidth extension information or channel allocation information for non-legacy terminals performing orthogonal frequency division multiple access (OFDMA) transmission or transmission through a continuous/non-continuous expanded bandwidth. According to an embodiment, when a packet is transmitted through a broadband channel where a plurality of channels are combined, the non-legacy additional information of a packet transmitted through a specific channel may indicate information on another channel combined with the corresponding channel. For example, when a packet is transmitted with a bandwidth of 40 MHz, non-legacy additional information included in the packet of 20 MHz band may indicate the position of another 20 MHz band. In addition, when a packet is transmitted with a bandwidth of 60 MHz, the non-legacy additional information may represent information on the configuration of the 60 MHz occupying band among the entire 80 MHz available band by using a bit map or a look-up table. In addition, according to a further embodiment, the non-legacy additional information includes new primary channel/secondary channel information such as an alternative primary channel used in the non-legacy terminal, thereby supporting various bandwidth configurations of the non-legacy terminal.

According to an embodiment of the present invention, the non-legacy packet may include at least one of the above-mentioned 1) to 5) as non-legacy additional information. According to an embodiment, the non-legacy additional information is represented by a predetermined bit field of the legacy preamble of the non-legacy packet. More specifically, the L-SIG of the legacy preamble includes a rate field and a length field, and the non-legacy additional information may be represented by a combination of specific bit information not used in the legacy terminal among the fields. For example, in the legacy packet, the length field of the L-SIG may be set to a value of multiple of 3. In this case, the length field of the L-SIG may be set to include a value other than a multiple of 3 in the non-legacy packet to represent non-legacy additional information. According to an embodiment, the length of the CP section of the non-legacy symbol may be determined to be one of three values (e.g., 0.8 us, 1.6 us, and 3.2 us), and the result value of modulo operation of the length field may indicate any one of the three values. In this case, the length of the selected CP section may be applied to the symbols of the HE-STF and the HE-LTF of the non-legacy preamble.

According to another embodiment of the present invention, the non-legacy additional information is represented by an additional subcarrier of the legacy preamble of the non-legacy packet. According to an embodiment of the present invention, the legacy preamble of the non-legacy packet may include a first subcarrier set for the legacy terminal and a second subcarrier set for the non-legacy terminal. In this case, the second subcarrier set includes a plurality of subcarriers added to the guard band region of the first subcarrier set used in the legacy packet, and may be identified by the non-legacy terminal but may not be identified by the legacy terminal. The non-legacy packet may represent the non-legacy additional information through the second subcarrier set of the legacy preamble, and the corresponding information may be extracted and decoded by the non-legacy terminal. Meanwhile, although the non-legacy additional information listed above is described as being included in the legacy preamble, the present invention is not limited thereto, and at least some of them may be included in the non-legacy preamble.

Figure 18:
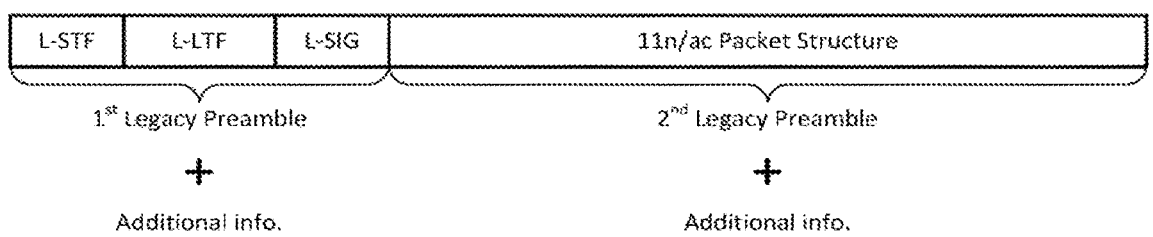
FIG. 18 is a diagram illustrating a structure of a legacy packet including non-legacy additional information according to an embodiment of the present invention.

FIG. 18 illustrates a structure of a legacy packet including non-legacy additional information according to an embodiment of the present invention. According to an embodiment of the present invention, a processor of a non-legacy terminal may generate legacy packets according to the embodiment of FIG. 18 and transmit the generated packets through a transceiver. The legacy packet according to the embodiment of FIG. 18 may be used as a packet transmitted from the non-legacy terminal to the legacy terminal as in the scenario of FIGS. 15 and 16. In the embodiment of FIG. 18, the same or corresponding parts as those of the embodiment of FIG. 17 will be omitted.

According to an embodiment of the present invention, a non-legacy terminal generates legacy packets including non-legacy additional information and transmits the generated packets. The legacy packet includes packets of 11a/g/n/ac. If the legacy packet is an 11n/ac packet, the corresponding packet includes a first legacy preamble and a second legacy preamble as shown in FIG. 18. Here, the first legacy preamble indicates the preamble of an 11a/g packet including the legacy preamble in the above embodiment, i.e., the L-STF, the L-LTF, and the L-SIG. In addition, the second legacy preamble indicates the HT preamble or VHT preamble. On the other hand, although not shown in FIG. 18, the legacy packet may be an 11a/g packet, and in this case, the corresponding packet may include only the first legacy preamble.

According to an embodiment of the present invention, at least one of the first legacy preamble and the second legacy preamble of the legacy packet transmitted by the non-legacy terminal may include non-legacy additional information for the non-legacy terminal. If the legacy packet is an 11a/g packet, the non-legacy additional information may be included in the first legacy preamble. According to an embodiment of the present invention, the non-legacy additional information included in the legacy preamble of the legacy packet may include at least one of the following listed information.

1) Legacy mode (i.e., 11a/g/n/ac) indicator. First, the non-legacy additional information may include the wireless LAN communication standard mode information used in the corresponding packet. When the non-legacy additional information of the received packet indicates one of legacy wireless LAN modes (e.g., 11a/g/n/ac), the non-legacy terminal may omit or simplify the auto detection process for determining the format of the received packet. For example, if the non-legacy additional information indicates that the corresponding packet is an 11n packet, the non-legacy terminal receiving the packet may assume that the transmission symbol configuration after the L-SIG is QBPSK+QBPSK, and immediately perform reception and decoding processes. In addition, when the non-legacy terminal performs the auto detection process, it is verified in advance that the transmission symbol configuration of the corresponding packet after the L-SIG is QBPSK+QBPSK, so that unnecessary blind decoding processes may be omitted.

2) Preamble information for non-legacy terminals. Next, the non-legacy additional information may further include preamble information for the non-legacy terminal. In this case, the preamble information for the non-legacy terminal may be represented through a combination of specific bit information not used in the legacy terminal among the legacy preambles. That is, the L-SIG of the first legacy preamble or the SIG information for the legacy terminals in the HT/VHT-SIG of the second legacy preamble may be maintained as it is, and represent preamble information for the non-legacy terminal through reserved bits in the corresponding SIG.

3) Additional information for CCA operation of non-legacy terminal. As described above with reference to FIG. 17, the non-legacy terminal may perform CCA using additional parameters. In this case, the non-legacy additional information of the legacy packet may include a parameter for the CCA operation of the non-legacy terminal, such as the BSS identifier information. The non-legacy terminal receiving the legacy packet according to the embodiment of FIG. 18 may determine the CCA threshold value for the corresponding packet based on the BSS identifier information included in the non-legacy additional information of the corresponding packet.

4) Bandwidth extension and channel allocation information. Finally, the non-legacy additional information may include bandwidth extension information or channel allocation information in order to support the non-legacy terminal performing OFDMA transmission or transmission through a continuous/non-continuous expanded bandwidth. For example, the non-legacy AP may transmit downlink channel information usable by another non-legacy STA through the non-legacy additional information of the legacy packet transmitted through a specific channel. In addition, the non-legacy STA may transmit a non-legacy packet through another channel/band while transmitting a legacy packet through a specific channel. In this case, information on another channel/band through which the non-legacy packet is transmitted may be included as the non-legacy additional information of the legacy packet. AP receiving the information may simultaneously receive a legacy packet and a non-legacy packet based on the corresponding information.

According to an embodiment of the present invention, the legacy packet transmitted by the non-legacy terminal may include at least one of the above-mentioned 1) to 4) as non-legacy additional information. As described in the embodiment of FIG. 17, the non-legacy additional information may be represented by a predetermined bit of at least one of the first legacy preamble and the second legacy preamble of the legacy packet. In addition, the non-legacy additional information may be represented by additional subcarrier(s) of at least one of the first legacy preamble and the second legacy preamble of the legacy packet.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof. In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

MODE FOR INVENTION

As above, related features have been described in the best mode.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication terminal, comprising:
a transceiver; and
a processor;
wherein the processor is configured to:
receive a preamble of a wireless packet through the transceiver,
wherein the preamble is comprised of a first preamble and a second preamble,
wherein the second preamble includes a first high efficiency signal(HE SIG) field composed of two or four symbols,
wherein a format of the wireless packet is identified by using a second symbol of the first HE SIG field, and
wherein whether a second HE SIG field is included in the second preamble is determined based on a modulation scheme of the second symbol of the first HE SIG field, and
receive a data of the wireless packet.

2. The wireless communication terminal of claim 1, wherein at least one field constituting the second preamble or a symbol configuration of the at least one field are identified by the second symbol.

3. The wireless communication terminal of claim 1, wherein the first preamble includes a legacy signal(L-SIG) field, and
wherein the second symbol is located in a $3^{rd}$ symbol after the L-SIG field.

4. The wireless communication terminal of claim 3, wherein the wireless packet is identified as a legacy packet or a non-legacy packet according to whether a specific field is repeated in a symbol after the L-SIG field.

5. The wireless communication terminal of claim 1, when the second symbol is modulated by a first modulation scheme,
wherein the first HE SIG field is composed of two symbols, and
wherein the second preamble further includes the second HE SIG field.

6. The wireless communication terminal of claim 1, when the second symbol is modulated by a second modulation scheme,
wherein the first HE SIG field is composed of four symbols, and
wherein the second preamble does not include the second HE SIG field.

7. The wireless communication terminal of claim 1, when the first HE SIG field composed of two symbols,
wherein a first symbol and the second symbol included in the first HE SIG field are modulated with a binary phase shift keying(BPSK).

8. A wireless communication method of a terminal, the method comprising:
receiving a preamble of a wireless packet through the transceiver,
wherein the preamble is comprised of a first preamble and a second preamble,
wherein the second preamble includes a first high efficiency signal(HE SIG) field composed of two or four symbols,
wherein a format of the wireless packet is identified by using a second symbol of the first HE SIG field, and
wherein whether a second HE SIG field is included in the second preamble is determined based on a modulation scheme of the second symbol of the first HE SIG field; and
receiving a data of the wireless packet.

9. The wireless communication terminal of claim 8,
wherein at least one field constituting the second preamble or a symbol configuration of the at least one field are identified by the second symbol.

10. The wireless communication terminal of claim 8,
wherein the first preamble includes a legacy signal(L-SIG) field, and
wherein the second symbol is located in a $3^{rd}$ symbol after the L-SIG field.

11. The wireless communication terminal of claim 10,
wherein the wireless packet is identified as a legacy packet or a non-legacy packet according to whether a specific field is repeated in a symbol after the L-SIG field.

12. The wireless communication terminal of claim 8, when the second symbol is modulated by a first modulation scheme,
wherein the first HE SIG field is composed of two symbols, and
wherein the second preamble further includes the second HE SIG field.

13. The wireless communication terminal of claim 8, when the second symbol is modulated by a second modulation scheme,
wherein the first HE SIG field is composed of four symbols, and
wherein the second preamble does not include the second HE SIG field.

14. The wireless communication terminal of claim 8, when the first HE SIG field composed of two symbols,
wherein a first symbol and the second symbol included in the first HE SIG field are modulated with a binary phase shift keying(BPSK).

* * * * *